No. 815,910. PATENTED MAR. 20, 1906.
C. C. DOLAN.
AUTOMOBILE SLEIGHING ATTACHMENT.
APPLICATION FILED JUNE 13, 1905.
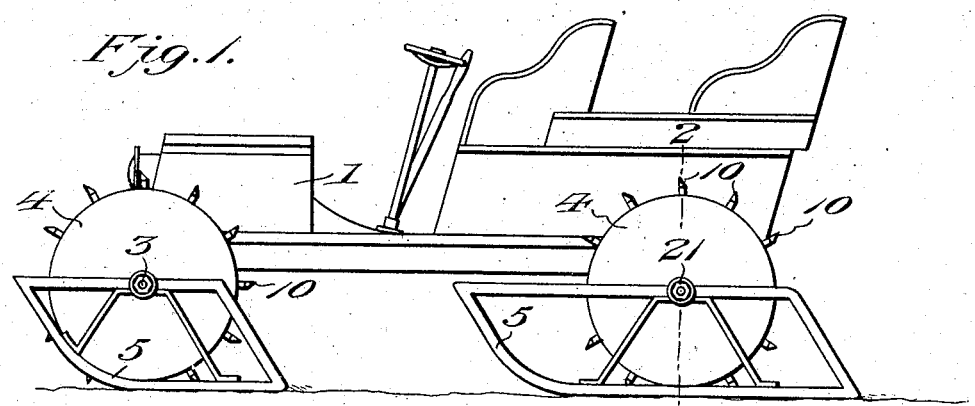
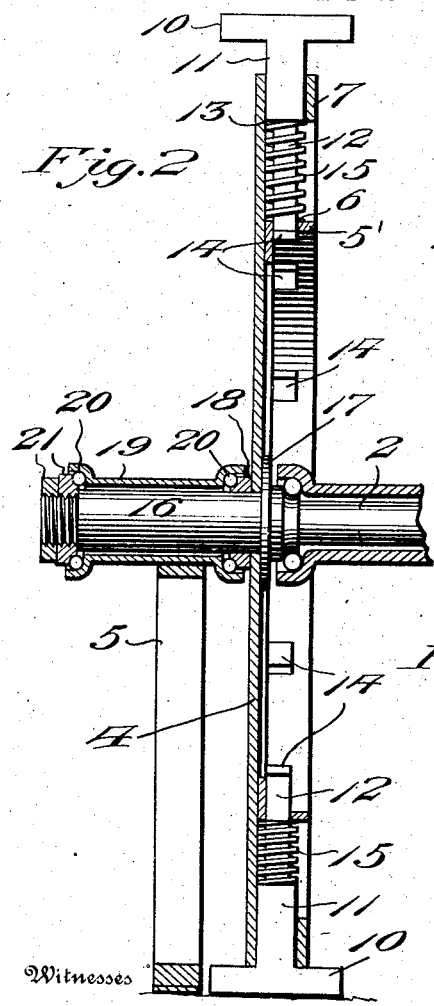
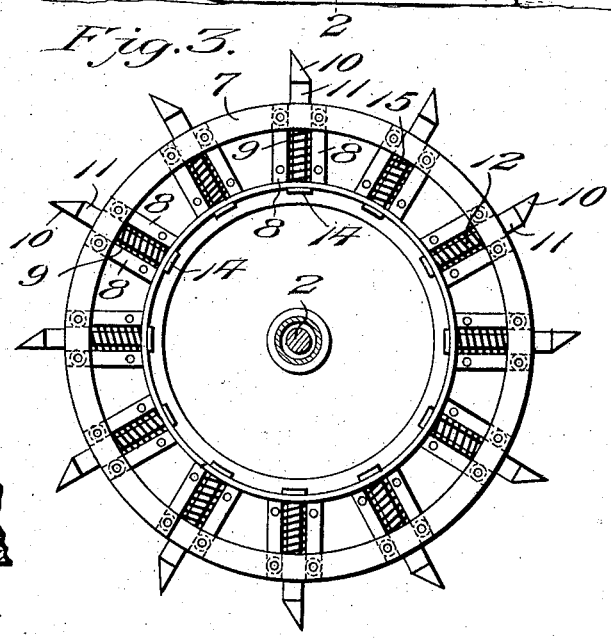
Witnesses
Edwin G. McKee
G. A. Elmore
Inventor
Christopher C. Dolan
By Victor J. Evans
Attorney

UNITED STATES PATENT OFFICE.

CHRISTOPHER C. DOLAN, OF LOCKPORT, NEW YORK.

AUTOMOBILE SLEIGHING ATTACHMENT.

No. 815,910.      Specification of Letters Patent.      Patented March 20, 1906.

Application filed June 13, 1905. Serial No. 265,035.

*To all whom it may concern:*

Be it known that I, CHRISTOPHER C. DOLAN, a citizen of the United States, residing at Lockport, in the county of Niagara and State of New York, have invented new and useful Improvements in Automobile Sleighing Attachments, of which the following is a specification.

This invention relates to sleighing attachments for automobiles, and has for its objects to produce a comparatively simple inexpensive device of this character which may be readily applied to a motor-vehicle for adapting it for use as a sleigh, one in which the vehicle will in operation be caused to travel positively and smoothly over the ground, and one wherein the ice-engaging members or creepers will operate with a yielding action, thus to obviate unpleasant motion of the vehicle and injury to the surface of a paved road.

With these and other objects in view the invention comprises the novel features of construction and combination of parts more fully hereinafter described.

In the accompanying drawings, Figure 1 is a side elevation showing conventionally an automobile equipped with a sleighing attachment embodying the invention. Fig. 2 is an enlarged section taken on the line 2 2 of Fig. 1. Fig. 3 is an inner face view of one of the propelling-wheels. Fig. 4 is a detail plan view of a portion of one of the runners and its hub.

Referring to the drawings, 1 designates a motor-vehicle having a rear drive-shaft or axle 2 and a front axle 3, these parts being of the usual or any appropriate construction and material and adapted in practice to perform their ordinary functions.

In accordance with the present inveniton the rear shaft or axle 2, which is driven in any suitable manner, is equipped with propelling members or wheels 4 and runners 5, these parts being substituted for and interchangeable with the usual transporting-wheels of the vehicle.

The propelling members or wheels 4, which are identical in construction and operation, are each provided upon its normally inner face with a horizontally-projecting bearing portion of flange 5', disposed concentric with and suitably remote from the marginal edge of the wheel and having bearing openings or perforations 6 arranged at appropriately-spaced intervals and at equal distances apart, there being attached to the inner face of the wheel or disk 4 a bearing ring or annulus 7, spaced from the face of the wheel by means of spacing members or blocks 8, riveted or otherwise secured to the latter, said blocks, which extend radially of the disk, being arranged in pairs spaced to produce guideways 9 in axial alinement with the openings 6.

Carried by each of the wheels 4 is a series of sharpened engaging members or creepers 10, preferably of the form herein shown, to extend transversely of the wheel and having shanks or stems 11 seated between the ring 7 and adjacent face of the wheel and provided with reduced portions or sections 12, presenting shoulders 13, the sections 12 being entered, respectively, through the opening 6 and terminated at the inner face of the flange 5' in engaging portions or heads 14, which serve through contact with the flange to limit the outward movement of the engaging members under the action of normally expanded springs 15. It is to be observed in this connection that the engaging members 10 have their shanks 11 disposed for longitudinally-sliding movement each in one of the guideways 9, which also receive the springs 15, and that under this arrangement the members will act yieldably in engaging the surface over which the propelling-wheels travel. Further, it is to be noted that the engaging members 10 are of a length somewhat greater than the width of the wheel 4, whereby they will contact with the peripheries of the wheel and rim 7 to limit their inward movement, as seen in Fig. 2 and for a purpose which will hereinafter appear.

The wheels 4 are each provided with a hub or sleeve 16, formed at its inner end with an outturned bearing portion or flange 17, against which the inner face of the wheel contacts, there being arranged upon the hub or sleeve and for contact with the outer face of the wheel a bearing member or ring 18, while the runners 5 are each provided with a fixed hub or sleeve 19, adapted to fit loosely upon the hub 16 and maintained out of contact with the latter by means of antifriction-balls 20, arranged, preferably, as herein shown. The hub 16, which fits upon the usual wheel-receiving spindle of the axle for rotation therewith, is adapted in practice to revolve within the sleeve 19, which latter and hub 16 are secured in place, as usual, by means of nuts 21, threaded onto the end of the axle-spindle.

In practice when the shaft 2 is driven the propelling-wheels 4 will move therewith and through engagement of the members or creepers 10 with the snow or ice will cause the runners 5 to slide over the latter and impart motion to the vehicle, as will be readily understood. It is to be particularly observed that as the members 10 come into engagement with the surface they will move inward against the action of springs 15, which are thus compressed, and consequently will, as heretofore mentioned, have a yieldable engaging action thus to prevent marring of a paved or concrete road over which the vehicle may be traveling, it being apparent that after each of the members 10 has passed out of contact with the surface it will be automatically returned to normal position, owing to expansion of the spring 15, and, further, that the shanks 11 of the engaged members will be guided in their movement through the medium of the guide-openings 6 and spaced guide members 8. As the engaging members 10 move into engagement with the surface over which the wheel 4 travels they will yield under the influence of the springs 15 until their inner edges contact with the periphery of the wheel for limiting their inward movement and causing them to present a rigid front to the ground-surface. Thus it will be seen that under this construction the engaging members combine the twofold advantage of yieldability while moving into engagement with the ground for relieving uneven movement of the wheel 4 and after such engagement remaining rigid for insuring a firm engagement with the surface over which the wheel travels.

I have herein shown the vehicle as having its front axle equipped with propelling members 4, which will serve to carry the front runners 5 over surface spaces which may be barren of snow or ice, it being understood that this is the only function performed by the front propellers. They may be and in the majority of instances are dispensed with.

From the foregoing it is apparent that I produce a comparatively simple inexpensive device of the character described admirably adapted for the attainment of the ends in view, it being understood that minor changes in the details herein set forth may be resorted to without departing from the spirit of the invention.

Having thus described my invention, what I claim is—

1. The combination with a vehicle and its axle, of a propelling-wheel fixed upon and for rotation with the axle, said wheel being provided with a horizontal flange having guide-openings, a bearing-ring attaching to the wheel at a point beyond the flange, spaced members interposed between the bearing-ring and wheel and constituting guides, yieldable surface-engaging members having shanks arranged in the guides and movable through the openings in the flange, and springs for maintaining the engaging members in normal projected condition, said members being extended laterally beyond their shanks for contact with the periphery of the wheel to limit their inward movement.

2. The combination with a vehicle and its axle, of a propelling member fixed upon the latter and provided with surface-engaging members, a sleeve provided on the propelling member, a runner having a hub rotatively mounted on the sleeve and antifriction members interposed between the hub and sleeve.

In testimony whereof I affix my signature in presence of two witnesses.

CHRISTOPHER C. DOLAN.

Witnesses:
JOHN L. FLETCHER,
K. ALLEN.